Oct. 30, 1962  S. HOLMQUIST  3,060,867
MONOBEAM RAILWAY AND VEHICLE EQUIPMENT
Filed May 19, 1960  5 Sheets-Sheet 3

INVENTOR
Sixten Holmquist
BY Shauch, Nolan & Neale
ATTORNEYS

Oct. 30, 1962 S. HOLMQUIST 3,060,867
MONOBEAM RAILWAY AND VEHICLE EQUIPMENT
Filed May 19, 1960 5 Sheets-Sheet 5
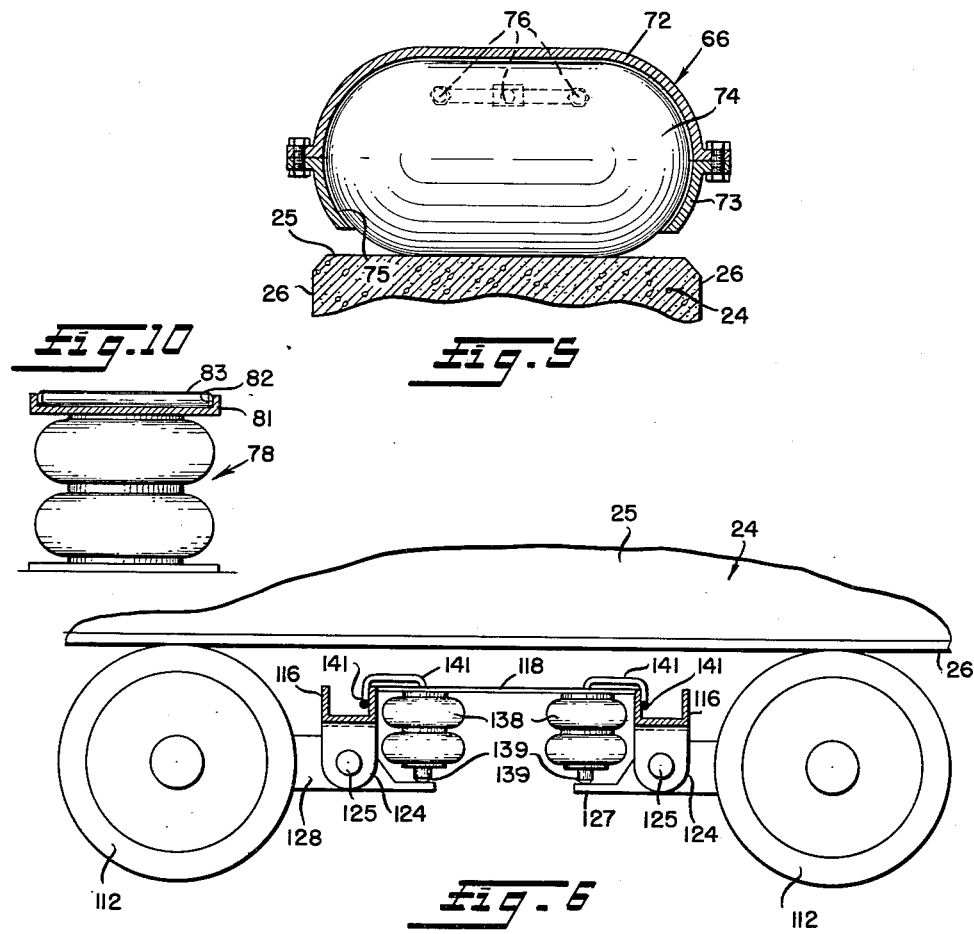
INVENTOR
Sixten Holmquist
ATTORNEYS United States Patent Office 3,060,867
Patented Oct. 30, 1962

1

3,060,867
MONOBEAM RAILWAY AND VEHICLE
EQUIPMENT
Sixten Holmquist, New York, N.Y., assignor to Alwac
International, Inc., Nassau, Bahamas, a corporation of
Panama
Filed May 19, 1960, Ser. No. 30,274
18 Claims. (Cl. 105—145)

The present invention relates to improvements in monobeam railway and vehicle equipment. More particularly the present invention comprises improvements in "Alweg" monobeam railway vehicles of the type in successful operation at Fuhlingen, Germany and Disneyland, California which override and straddle the supporting monobeam track. In such prior vehicles, as illustrated for example in United States Patent No. 2,932,258 issued April 12, 1960, the load carrying floor space is interrupted by central wheel housings considered objectionable by some transit authorities. It is, therefore, an object of the present invention to provide improved monobeam vehicles of the foregoing type having a low center of gravity and flat load carrying through floors without wheel housings extending above the floor level.

Another object is to provide improved low center of gravity monorail vehicles having relatively low resistance to movement particularly at higher speeds of operation, with lower driving power requirements, and improved safety and economy of operation under modern high speed transit requirements.

Still another object is to provide improved monobeam vehicles of powered and trailer types with a supporting cushion of air between the vehicle body and the beam or track to minimize frictional resistance to forward movement of the vehicle.

A further object is provision of novel driving and supporting arrangements for monobeam vehicles in which the vehicle body and load weights are reflected in the driving traction.

A still further object is to provide novel vehicle driving and braking arrangements through tractive engagement with the beam sides and with the vehicle weight supported from the top monobeam surface.

Additional objects and advantages of the invention will become apparent as the description proceeds in connection with the accompanying drawings, and from the scope of the appended claims.

As shown in the drawings:

FIGURES 1 and 1A comprise a side elevation of adjacent articulated body sections of a monobeam railway having a common truck chassis at their connected ends with parts broken away to show the internal seating, through floor, and truck relationships.

FIGURE 6 is a fragmental plan view showing the mechanisms for variably frictionally engaging the driving wheels of the chassis or truck assembly with the monobeam side face.

FIGURE 7 is a plan view partially in section showing the mounting of the lower idling stabilizing wheel of the chassis or truck assembly.

2

Figure 3:
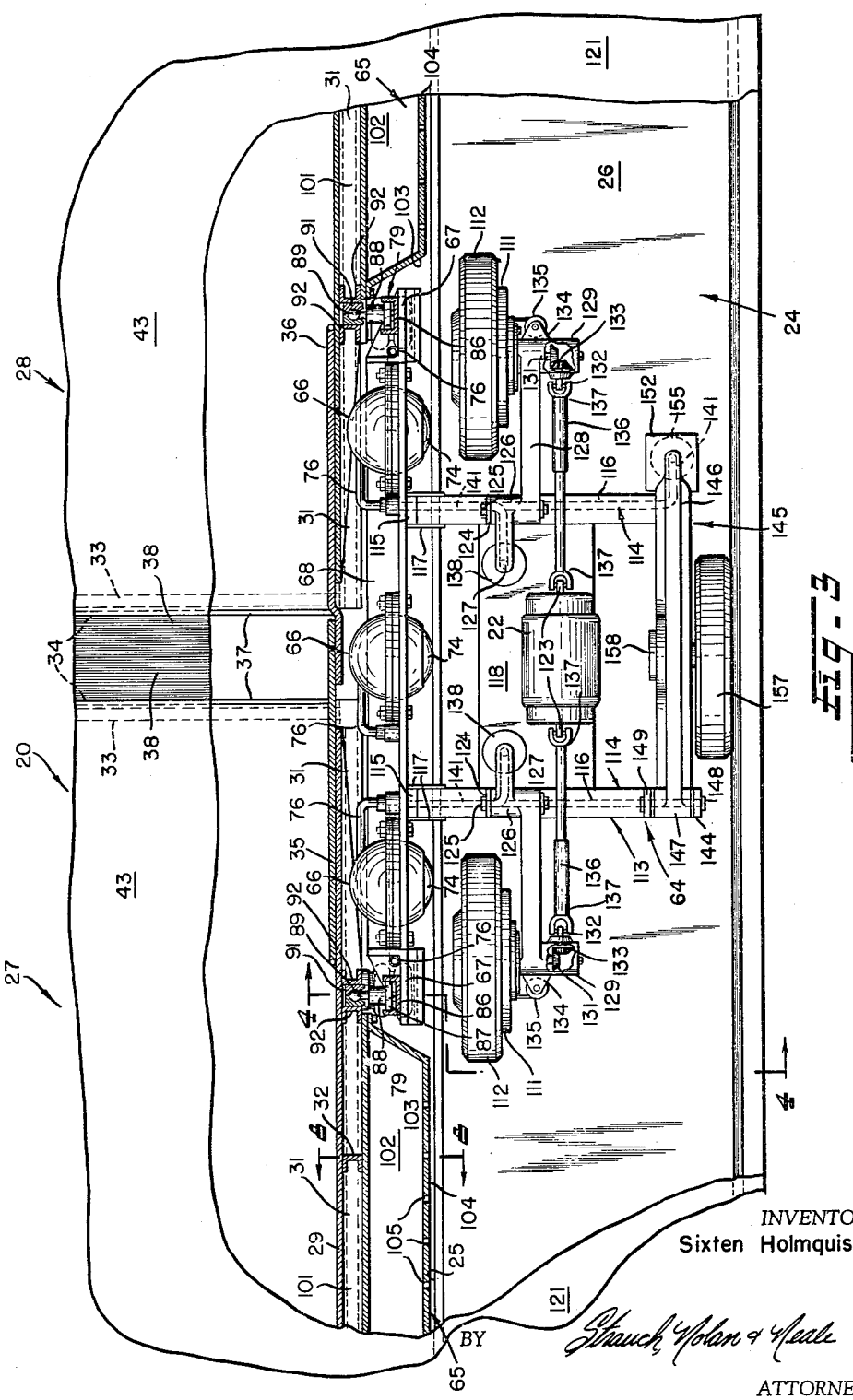
FIGURE 3 is an enlarged fragmental side elevation of the structure of FIGURE 1 with parts broken away to better illustrate the common truck chassis and its air bearing and air cushion type truck and body support from a monobeam.

FIGURE 8 is a detailed sectional view taken along line 8—8 of FIGURE 3 showing the air cushion chamber relationship of the vehicle body to the top of the supporting monobeam.

FIGURE 9 is a side elevational view of a monobeam railway made up of a pair of tandem connected subway type car bodies having respective end supporting truck chassis with parts broken away to show details of construction.

FIGURE 10 is a detailed view through one of the truck chassis mounted air springs showing the needle bearing slide plate abutment structure.

With continued reference to the drawings wherein like reference numerals are used throughout the various views to indicate the same parts, the present invention is illustrated in connection with a train 20 made up of articulated car bodies (FIGURES 1 through 8) and a train 21 made up of tandem connected subway type car bodies (FIGURE 9). Aside from the generally recognized differences in truck chassis construction employed in trains made up of these distinctively different types of car bodies, the sole difference in the illustrated trains 20 and 21 resides in the employment of electrical motors 22 in train 20 and diesel engines 23 in train 21. Either train may be run on the same monobeam trackway 24 illustrated here as a reinforced concrete beam of generally rectangular configuration in cross-section and providing a top running surface 25 and oppositely facing side running surfaces 26 (FIGURES 4 to 6 and 8). As will be apparent from these views, running surfaces 25 and 26 are respectively horizontally planar and vertically planar. While it is to be understood that both surfaces for the most part are longitudinally planar, grade variations and left and right turns necessitate conventionally constructed concave and convex transition areas of suitable curvature to assure proper tracking of the air cushioning support roller means and the traction and sidesway stabilizer wheels to be presently described.

Figure 1:
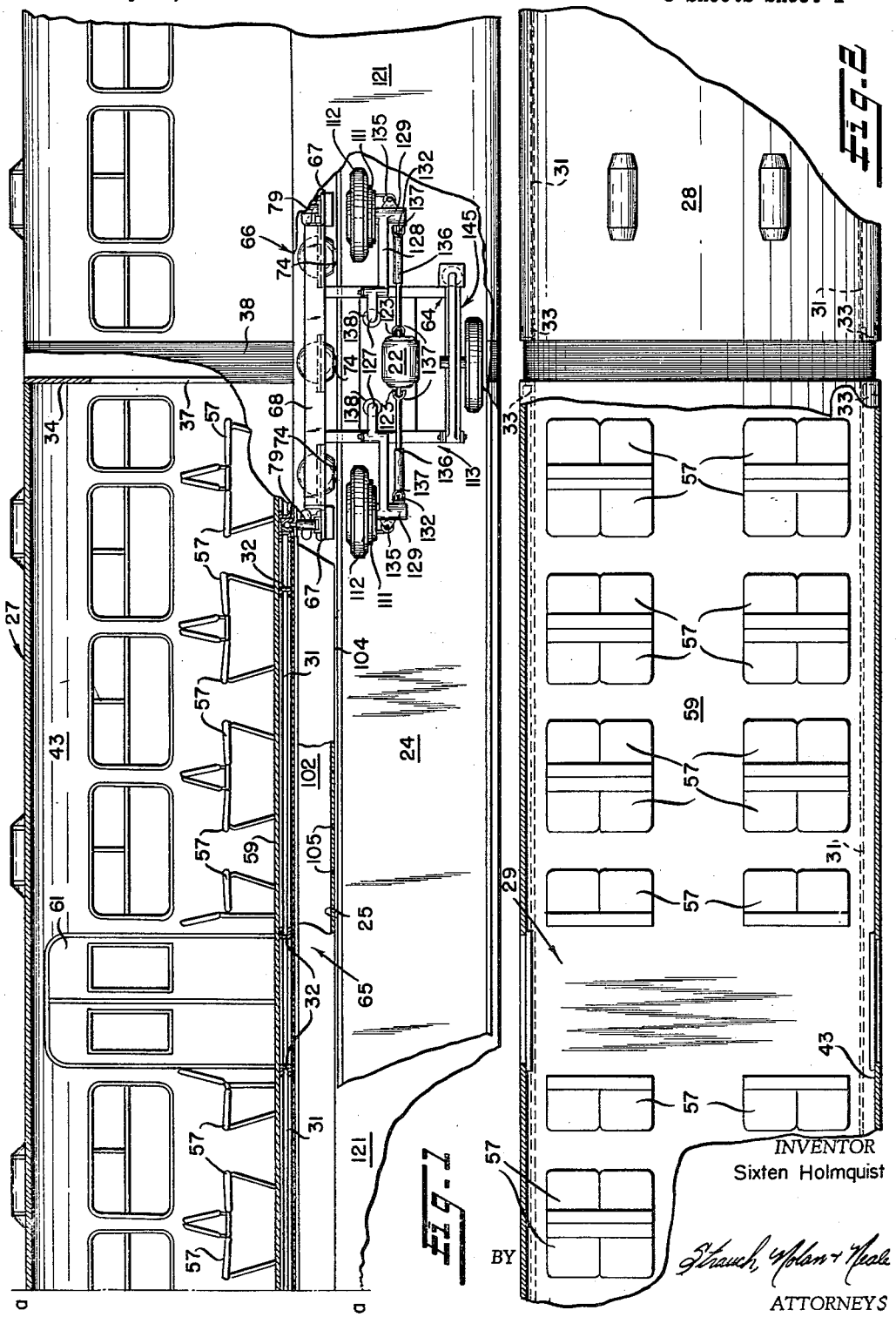
Figure 2:
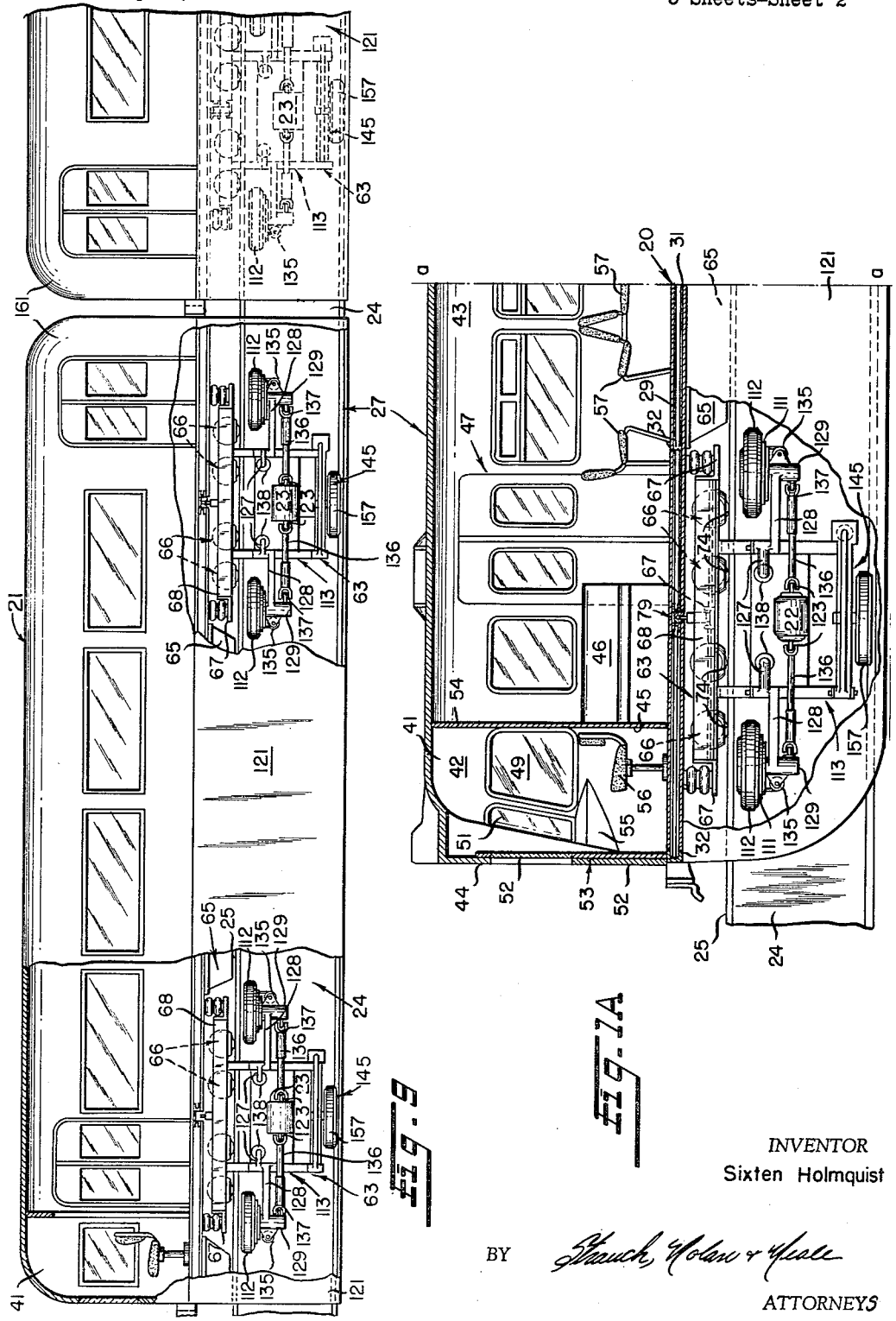
FIGURE 2 is a plan view showing of the seating arrangement illustrated in FIGURE 1.

Referring for the moment to FIGURES 1 through 8, train 20 comprises two or more articulated car bodies 27 and 28. Car body 27 is designed to be used as a lead car while car body 28 can be designed either as an intermediate trailing car or the final or rearmost trailing car. The principal differences in these varying types of cars being in the truck chassis employed for the terminal ends of the foremost and rearmost cars of the train as will presently appear. Each of the cars 27 and 28 has a planar floor 29 extending from side to side and end to end welded or otherwise fixedly secured to a rigidly reinforced channel bar frame assembly including side stringers 31 and cross members 32 preferably welded together in well known manner. As best seen in FIGURES 2 and 3, side stringers 31 of cars 27 and 28 respectively extend rearwardly and forwardly at the opposite connected ends of planar floor 29 to provide edge support for the floors and support for the lower ends of corner posts 33 of car body end walls 34 (FIGURE 3). The adjacent ends of floors 29 have oppositely projecting edge overlapped swivel plates 35 and 36 welded thereto and designed to span the open space between the spaced ends of floors 29 and permit relative lateral shifting of the opposing floor ends as the articulated cars round the curves formed along trackway 24. The car end walls 34 are apertured at 37 (FIGURES 1 and 3) to provide doorways between the adjacently connected car ends and accordion pleated flexible sidewall and roofing stripping 38 having its opposite vertical and horizontal edges secured to each car end along the outer car body edges in conventional manner is provided to enclose the connecting passageway between adjacent car ends.

The car side walls may be provided with door and window openings in any desired manner consistent with the seating plan adopted in accord with the single level floor line permitted by the present invention in truck construction. For example, the particular seating plan disclosed in FIGURES 1 through 2 provides an operator's compartment 41 (FIGURE 1A) at the front end of car body 27 defined by the inwardly curving front wall sections 42 of the opposed side walls 43, the laterally directed front wall segment 44 interconnecting the inner opposed free edges of front wall sections 42 and the front edge 45 of oppositely side facing, back-to-back seat assemblies 46 laterally centered with respect to car 27 forwardly of a pair of opposed double doors 47 in the opposite side walls 43. Such an operator's compartment 41 provides the operator with substantially free vision through at least a 180° angular sweep provided by the laterally opposed inwardly curving sidewall windows 49, the adjacently forwardly located pair of generally forwardly facing curved windows 51 and the doorway opening 52 normally closed by a windowed, inwardly swinging door 53. If desired, compartment 41 may be fully or partially isolated from the main passenger carrying body portion by a cross partition 54 extending laterally completely or partially across the car body at the forward edge 45 of seat assemblies 46. Preferably the operator's control panel 55 and seat 56 are disposed at one side of car body 27, the right side as seen in FIGURE 1A.

As best seen in FIGURES 1 and 2, the seating arrangement of car 27 rearwardly from the front double doors 47, comprises double row seating along each side wall with the pairs of seats 57 in each row alternately facing front and rear. This arrangement provides a center through aisle 59 (FIGURE 2) extending rearwardly through car 27 and the full length of each trailing car 28 wherein the driver's compartment and side facing seats 46 defining the rear compartment limit is omitted and replaced by forwardly and rearwardly related seat pairs 57. Opposed pairs of double doors 61 are also provided in side walls 43 adjacent the rear end of car 27 and the opposite ends of cars 28 to permit speedy ingress and egress of passengers.

Figure 4:
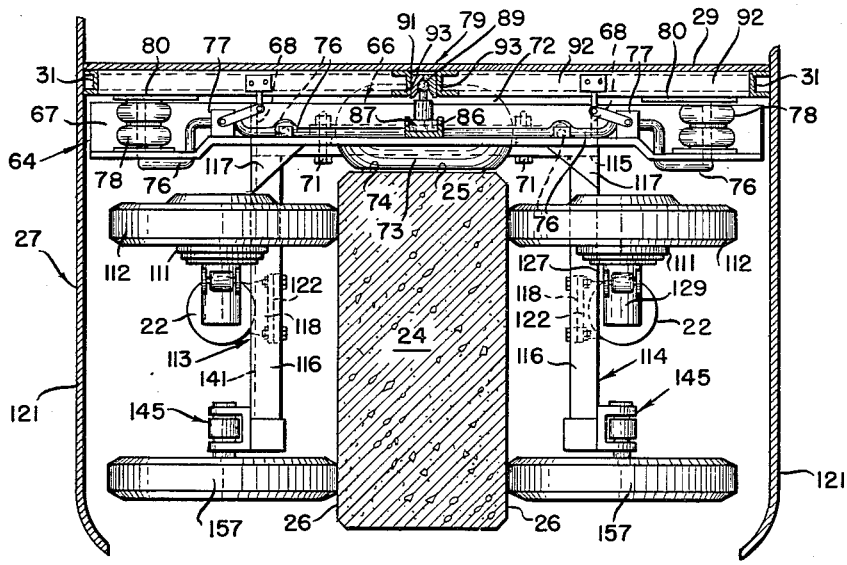
FIGURE 4 is a sectional view taken along line 4—4 of FIGURE 3.
Figure 5:
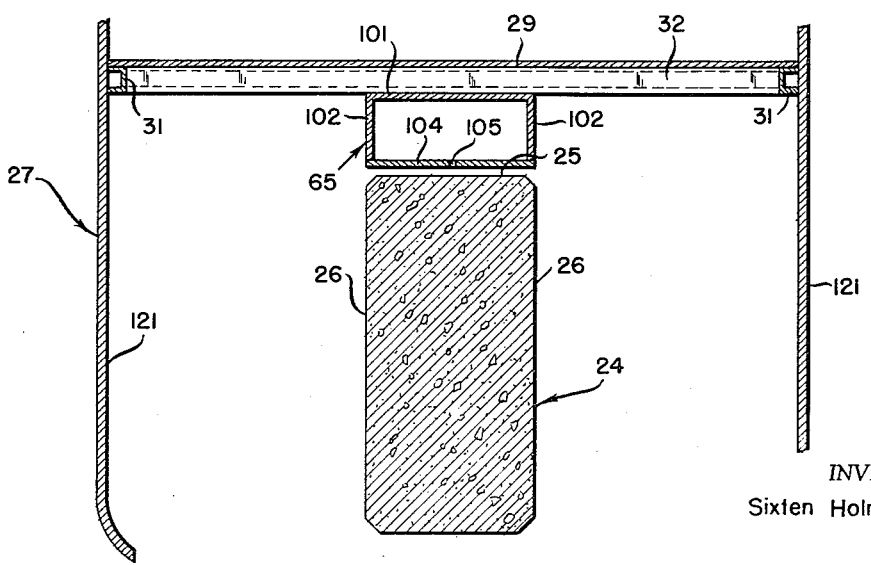
FIGURE 5 is a fragmental sectional view through an air bearing type of roller which supports the truck assembly of FIGURE 4 on the top of the monobeam.

The principal factor which permits the uninterrupted and low floor 29 of the cars of this invention is the novel air cushioned truck and suspension arrangement which will now be described. This suspension arrangement in the train of FIGURES 1 through 8 comprises a pair of identical single hitch end truck assemblies or bogies 63 for respectively supporting the front and rear ends respectively of the lead and rearmost trailing cars, intermediate double hitch truck assembiles or bogies 64 for respectively supporting the adjacent joined ends of each tandem related pair of cars 28 and an air pressure jet chamber 65 extending in subjacent longitudinal alignment along the center of the underside of each car between succeeding support trucks throughout the entire train's length. Since trucks 63 and 64 are generally similar except for the pivotal connecting structures, respectively, of the single hitch or connection type and the double hitch or connection type, and the number of air bearing support roller assemblies 66 to be presently described, a detailed description of truck 64 as depicted in FIGURES 3, 4 and 5 only will be given here.

Each truck assembly comprises a main frame made up of laterally extending, oppositely outwardly facing, end angle bars 67 rigidly connected in predetermined longitudinally spaced relationship by a pair of oppositely inwardly facing, longitudinally extending angle bars 68 the opposite ends of which are fixedly secured to the upstanding wall of angle bars 67 by suitable means such as welding. As best seen in FIGURE 4, angle bars 68 are disposed laterally outwardly of monobeam 24 with their inwardly facing horizontal flanges supporting the opopsite ends of air bearing roller assemblies 66 which are secured thereto by nut and bolt assemblies 71. The details of these air bearing roller assemblies 66 are the invention of one Bror M. Lindner disclosed in a copending application of the assignee of the present application filed April 4, 1960 and given Serial No. 19,932, now Patent No. 2,985,114. Reference to this copending application may be had for a more complete disclosure of these roller assemblies. Suffice it to say that nut and bolt assemblies 71 may be the same securing elements employed to secure the roller housing parts 72 and 73 together or separate attachment securing elements in event a preassembled air bearing roller assembly 66 as shown in FIGURE 5 is employed. In either case, the elongated roller 74 protrudes through the downwardly facing opening 75 of the housing part 73 into bearing contact with the upper face 25 of monobeam 24 and supports the suspended weight of the truck structure and the supported car ends through the layer of air introduced between the roller 74 and housing parts 72 and 73 from compressed air conduit system 76 as more fully disclosed in the aforesaid Bror M. Lindner copending application.

It is to be clearly understood that air bearing roller assemblies 66 perform a mere support function and that the propulsion and braking forces between the truck main frame and car bodies 27 and 28 are applied through the pivotal connections about to be described. This being the case, car bodies 27 and 28 are resiliently supported on the main frame of truck assemblies 63 and 64 through level ride air spring assemblies 78 also supplied from conduit system 76 which may take the form of any of the commercially available structures having lever operated alternate inlet and outlet valve assemblies 77 now employed in the automotive bus and private passenger vehicle field. Spring assemblies 78 are fixedly connected to the outer ends of angle bars 67 and at their upper ends bear on arcuate slide plates 80 (FIGURE 4) fixed to the underframing of the respective car body frame structures. The arcuate edges of plates 80 are generated around the axes of respective pivotal connections 79 of any suitable construction laterally centered with respect to the end angle bars 67 and provided to serve as draft connections between the respective car bodies and trucks 64. To minimize the lateral drag forces transmitted to spring assemblies 78 through frictional bearing loads generated as a result of relative pivotal movement of car bodies 27 and 28 around pivotal connections 79, the upper ends of spring assemblies 79 are provided with end thrust antifriction means, for example, a cup-like end plate 81 having an arcuate recess 82 concentrically arranged with respect to the axis of pivotal connections 79 and containing a series of generally radially disposed, hardened roller bearings 83 of a diameter sufficient to cause protrusion of the bearing rollers 83 above the cup lip to supportingly engage slide plates 80 (see FIGURE 10). Since the air springs 78 impart self levelling characteristics to the car bodies 27 and 28, it will be appreciated that bearing rollers 83 will be properly presented against slide plates 80 at all times and will effectively eliminate harmful frictional forces that might otherwise be developed by relative movement of the car bodies and trucks 64. Truck assemblies 63 having four air bearings and similar air spring assemblies 78 and slide plates 80 are provided with an additional longitudinally centered angle bar 67 (FIGURE 1A). This additional angle bar 67 supports at its center a horizontal pivotal connection 79 similar in all respects to the connections 79 of truck assemblies 64. This single pivotal connection 79 forms the sole draft connection between the truck assembly 63 and its associated car body.

It will be appreciated that the principal load forces acting on the pivot connections 79 will be the substantially horizontally directed draft and braking forces passing between the trucks 63, 64 and the respective car bodies during operation of the train. Since each truck assembly has its own drive motors or engines and its individual automotive type brakes as will presently appear, each pivot connection comprises a mounting seat 86 of rectangular cup shape configuration welded to the center of its supporting angle bar 67 and having the rectangular head 87 of a heavy stub shaft 88 welded therein. Stub shaft 88 extends upwardly and at its free upper end is provided with an integral ball shaped formation 89 adapted to be received in an axially split ball socket 91 confined between a pair of cross channel members 92 (FIGURES 3 and 4) end welded to body stringers 31 and longitudinally directed channel shaped reinforcing elements 93. This ball and socket connection provides full universal movement between shaft 88 fixed to the truck and the connected car body and socket member 91 may be and preferably is normally slidably received in the surrounding cage provided by channel members 92 and 93 with a substantial clearance between its upper face and floor 29. This clearance permits slight relative axial movement between the car body and truck to accommodate the slight elevational variances along surface 25 of monobeam 24 and the relative axial shifting that occurs as the train cars traverse the concave and convex monobeam transition zones at the bottom and top of a grade. In this connection, it will be appreciated that the axial length of the socket member 91 is such that it cannot leave its confining cage in normal operation over a properly designed monobeam track and that the sheer weight of the car body and its passenger load on air springs 78 will be sufficient to maintain the socket member 91 properly axially disposed in its cage. Furthermore, the auxiliary bumper spring (not shown) conventionally embodied in automotive air spring structures of the type heretofore mentioned will be suitably designed to support the car body, in event of loss of air pressure in the air spring system, so that socket member 91 cannot be driven through floor 29. Also, if desired, suitable means such as extensible shock absorbers or the like (not shown) may be provided to assure that separating relative axial movement between the car body and truck assemblies 63 and 64 will not cause axial withdrawal of socket member 91 from its cage.

The present invention bolsters the cushioning ride provided by the air bearings and air springs through the use of a supporting cushion of air between the respective car bodies and the monobeam rail. This is accomplished by securing the longitudinally extending air jet chambers 65 to the respective car body framing. As best seen in FIGURES 1 and 1A, each air jet chamber 65 extends between the front and rear truck assemblies of each car body. The width of air jet chambers 65 is approximately the same as that of the monobeam rail 24 as will be apparent from a consideration of FIGURE 8 of the drawings. These air chambers are made up of a mounting member 101 in the form of a continuous channel member, the depending side flanges 102 of which are respectively cut off at an angle as shown at 103 in FIGURE 3, and a bottom jet plate 104. Plate 104 is preferably welded to the edges of flanges 102 throughout their length to form a substantially integral fabricated chamber which can be readily secured as by welding to the car body cross members 32 and the outboard cross members 92 of the pivot connection ball socket defining cage. Plate 104 along its longitudinal center is provided with a series of spaced air jet openings 105 for directing a jet of air downwardly against surface 25 of monobeam 24 along its central area. In operation, air at a suitably high pressure is continuously supplied to air jet chambers 65 in any suitable manner well known in the art. The supplied air is continuously ejected through jet openings 105 against monobeam surface 25 in sufficient quantities to form a supporting layer of air between the monobeam rail 24 and the jet plate 104 in well known manner.

From the description so far given, it will be appreciated that the individual car bodies of train 20 are respectively independently supported at each end on a monobeam supported truck assembly through air springs 78 and through their length between the truck assemblies on the monobeam rail itself through a layer of cushioning air. It will furthermore be appreciated that the conventional level ride characteristics of the air spring system will tend to keep the car body laterally and longitudinally level with respect to the main frames of the truck assemblies at the opposite ends of each car irrespective of its load distribution and the size of the load. As a consequence, the car body itself is fully air cushioned from any shocks that might be imparted to the main frames of the truck assemblies. Additionally, the main frame of each truck assembly is supported on a cushioning layer of air formed between the rollers 74 and casing parts 72, 73 of the air bearing support roller assemblies 66. It follows, therefore, that the truck main frames are fully air cushioned from any shocks that might be imparted to the support rollers 74 due to mechanical rolling contact with surface 25 of monobeam rail 24. Furthermore, since rollers 74 serve merely to support the cars and their pay loads and have no driving or braking traction imparted thereto, the weight of the cars and their pay load is not effective to magnify the shock forces resulting from this mechanical rolling contact. The present invention, accordingly, assures an extremely soft and vibration free ride through the cooperating effect of the various air cushioning mechanisms employed.

Turning next to the driving and braking mechanism, motors 22 or diesel engines 23 as the case may be, the automotive type wheel brakes 111 and the drive wheels 112 and their drive connections are mounted on a depending sub-frame 113 secured to the longitudinal angle bars 68 of the individual truck assemblies 63 and 64. Referring to FIGURES 3 and 4, the sub-frame 113 is shown to be mounted in straddling relation to monobeam rail 24 and comprises a pair of axially spaced U-frame elements 114 made up of a heavy mounting bar 115, depending channel bar legs 116 end butt welded to the ends of mounting bars 115, reinforcing fishplates 117 to rigidify the connection between the legs 116 and mounting bar 115 and longitudinally extending mounting and reinforcing tie plates 118 extending between the depending legs at each side of monobeam rail 24. The sub-frames 113, as most clearly appears from FIGURE 4, provide rigid depending side frames disposed in laterally outwardly spaced relation to side faces 26 of monobeam rail 24 but well inside of the depending skirt portion 121 of car body sidewalls 43. Each side frame mounts a drive motor 22 or engine 23, the mounting pad 122 thereof being bolted to the respective mounting and reinforcing tie plate 118 so the motor or crank shaft 123 (FIGURES 3 and 9) extends longitudinally of the truck assembly 63 or 64 and protrudes from each end. Each leg 116 about midway of its length and adjacent the upper edge of plate 118 is provided with a U-shaped mounting bracket 124 the arms of which protrude laterally toward their respective adjacent car body sidewall skirts 121 and lie in vertically aligned relation. Each bracket 124 supports a vertically extending hinge or pivot pin 125 (FIGURE 3) which in turn pivotally mounts the elongated hub 126 of a double arm lever the short arm 127 of which extends from the upper end of hub 126 into overlying relation to plate 118 and the long arm 128 of which extends from the lower end of hub 126 in the opposite direction and terminates in an enlarged housing formation 129. Each housing 129 extends in a vertical direction and journals a respective wheel axle 131 (FIGURE 3), stub input shaft 132 and bevel gear set 133 drivingly connecting stub input shaft 132 and wheel axle 131. The upper end of wheel axle 131 and housing 129 mounts a respective drive wheel 112 and its brake mechanism 111 in accord with conventional automotive practice while a side wall bracket 134 secured to housing 129 mounts the brake actuating cylinder 135. A telescopic drive shaft 136 connected in conventional manner by respective universal joints 137 to the protruding ends of motor or engine shafts 123 and stub input shafts 132 drivingly connect the motor or engine to the respective drive wheel input shafts 132. Air springs 138 mounted on plate 118 opposite the free ends of arms 127 abuttingly engage arms 127 as indicated at 139 (FIGURE 6) to bias the respective double arm levers in a direction to frictionally engage the rubber tired periphery of drive wheels 112 with said faces 26 of monobeam rail 24. The air springs 138 are preferably interconnected through suitable conduits 141 passing upwardly through channel bar legs 116 to the conduit system valves 77 supplying air to level ride air springs 78 so that any increase or decrease in air pressure in air springs 78 may be reflected in air springs 138. In this way, the traction force applied by air springs 138 may be varied according to the passenger load to assure a non-slipping drive engagement between drive wheels 112 and surfaces 26 of monobeam rail 24.

The lower ends of legs 116 preferably mount a stabilizing wheel assembly 145. As best seen in FIGURES 3 and 7, wheel assembly 145 comprises a lever arm 146 the hub 147 of which is formed at one end and pivoted on a vertically extending pivot pin 148 mounted in the vertically spaced arms 149 of a bracket 151 rigidly fixed to the lower end of one subframe leg 116. The opposite end of lever arm 146 extends beyond the adjacently related subframe leg 116 and rigidly mounts channel shaped spring seat element 152. An opposing spring seat element 154 reinforced by a fishplate 153 is secured to the remote side flange of the adjacently related leg 116 and supports an air spring 155 also connected through conduit 141 to the air supply for air springs 78. Air spring 155 acts between seats 152 and 154 to bias lever 146 counterclockwise as seen in FIGURE 7 to firmly engage stabilizer wheel 157 journalled on a headed dead stub shaft 158 mounted on lever arm 146 midway between subframe legs 116. These oppositely acting stabilizer wheels act to maintain their associated truck assembly 63 or 64 in centered relation to monobeam rail 24 and maintain the truck main frames horizontal so that undesired tilting of the truck main frames cannot occur to disturb the level ride characteristics imparted to the car bodies by air springs 78.

Referring for the moment to FIGURE 9, it is to be noted that the train 21 therein illustrated is made up of a series of conventional tandem connected subway type cars 161 modified by substitution of truck assemblies or bogies 63 for supporting the opposite ends of each car and depending side wall skirts 121 to hide the truck assemblies and provide a streamlined shell for reducing the air resistance when moving along the monobeam rail 24. These cars are illustrated as being diesel engine driven and each car, as will be apparent from a consideration of FIGURE 8, provides ample free space within the skirts 121 and between the end supporting trucks 64 for the required diesel fuel tanks (not shown). It, therefore, will be clearly appreciated that the air cushioned principle of this invention is applicable to both styles of monorail vehicle structures whether electric motors 22 or diesel engines 23 are employed as the motive power.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letter Patent is:

1. A monorail railway comprising a monobeam assembly forming a trackway of indeterminate length having top and side running surfaces; and a load transportation vehicle comprising at least one pair of end connected car bodies each having substantially planar floors extending from end to end and side to side, a connecting passage way extending between the car bodies and adapted to permit independent relative lateral movement of said car bodies, and bogie truck assemblies pivotally subjacently disposed with relation to the respective ends of said car bodies to support said car bodies for movement along said trackway, said bogie truck assemblies comprising air bearing roller means supporting said bogie truck assemblies for movement along the trackway top running surface, air spring means for yieldingly supporting said car bodies upon said bogie truck assemblies and adapted to provide level ride characteristics to said car bodies, motor driven traction wheels mounted on said bogie assemblies at each side of said trackway for rotation in generally horizontal planes and air spring biasing means acting to yieldingly bias said traction wheels into friction driving contact with said trackway side running surfaces.

2. The monorail railway of claim 1 wherein said adjacently connected ends of said pair of car bodies are supported by a common bogie truck assembly having a main frame assembly of generally rectangular form having respective upstanding pivot connectors laterally centered along opposite ends and pivotally coupled to said respective car bodies and respective depressed seat formations at each corner and said air spring means includes a respective expansible air bag suspension assembly fixedly mounted in each depressed seat formation with its upper end supportingly connected to one of said car bodies.

3. The monorail railway of claim 1 wherein each end of each car body of said pair of car bodies is supported by a respective bogie truck assembly each having a main frame assembly of generally rectangular form providing a longitudinally centered cross support member mounting a single, upstanding, pivot connector in laterally centered relation on said cross member and pivotally coupled to its respective car body end and respective depressed seat formations at each corner and said air spring means includes a respective expansible air bag suspension assembly fixedly mounted in each depressed seat formation with its upper end supportingly connected to its associated car body.

4. The monorail railway of claim 1 wherein each car body in closely superimposed relation to said trackway top surface and throughout its length between front and rear bogie truck assemblies is provided with a high pressure compressed air chamber defining wall structure having downwardly directed air discharge jet openings adapted to emit compressed air in a manner to form a supporting cushion of air between the chamber defining wall structure and the trackway top surface.

5. The monorail railway of claim 1 wherein the air spring biasing means and air spring means of each bogie truck assembly have a common air supply conduit and a load responsive air valve for admitting air into and exhausting air out of said common air supply conduit whereby the friction driving contact of the respective traction wheels will vary in proportion to the vehicle load to assure an efficient non-slipping driving engagement between said traction wheels and said trackway side running surfaces under all vehicle load conditions.

6. The monorail railway of claim 5 wherein each traction wheel is provided with a respective fluid actuated wheel brake and each of said wheel brakes is connected to a common source of pressurized actuating fluid.

7. A monobeam railway train for use on a monobeam track providing upper and oppositely facing side running surfaces comprising at least one pair of articulated car bodies having generally planar floors extending from end to end and side to side and pivotal floor plates spanning the space between the adjacent floor ends at the connected ends of said car bodies; a common bogie for supporting the adjacently connected ends of each pair of car bodies disposed in spanning relation between and horizontally pivotally connected to said adjacent car body floor ends; and a respective bogie for horizontally pivotally supporting the free ends of the lead and final trailing cars, each of said bogies comprising a main support frame, air bearing roller means carried by said main support frame for supporting said main frame and its supported car body weight in air cushioned relation to the monobeam track upper surface, motor mounting and drive wheel-wheel brake supporting frames depending from each side of said main frame in laterally outwardly spaced relation to the respective monobeam track side surfaces, respective drive wheel assemblies, including drive wheel-wheel brake assemblies and a crank arm support pivotally connecting said respective drive wheel assemblies to said depending support frames for swinging movement toward and away from the monobeam track side surfaces, respective motor means mounted on each of said depending supporting frames and drive connected to said drive wheel assemblies, and respective air traction springs acting on said crank arm supports to bias said drive wheel assemblies in a direction to frictionally engage the monobeam track side surfaces, air support spring means interposed between the respective bogie main frames and the overlying car body structure to yieldingly support said car bodies on said bogies, air supply and exhaust means individual to said respective air bearing rollers, said air traction springs and said air support spring means to control the entry and exit of pressurized air thereto, and control means responsive to the varying load of the respective car bodies for actuating said supply and exhaust means to vary the supply of pressurized air to effect level, friction free, air support of said car bodies and bogies in their travel along said monobeam track and varying traction pressure between the respective drive wheel assemblies and the monobeam track side surfaces in accord with load conditions.

8. A monobeam railway train for use on a monobeam track providing upper end oppositely facing side running surfaces comprising at least one pair of tandem connected car bodies having respective generally planar floors extending from end to end and side to side and a connecting passage spanning the space between the adjacently connected car body ends; a respective bogie for supporting an end of each of said car bodies disposed beneath and horizontally pivotally connected to a respective car body end, each of said bogies comprising a main support frame, air bearing roller means carried by said main support frame for supporting said main frame and its supported car body weight in air cushioned relation to the monobeam track upper surface, motor mounting and drive wheel-wheel brake supporting frames depending from each side of said main frame in laterally outwardly spaced relation to the respective monobeam track side surfaces, respective drive wheel assemblies, including drive wheel-wheel brake assemblies and a crank arm support pivotally connecting said respective drive wheel assemblies to said depending support frames for swinging movement toward and away from the monobeam track side surfaces, respective motor means mounted on each of said depending supporting frames and drive connected to said drive wheel assemblies, and respective air traction springs acting on said crank arm supports to bias said drive wheel assemblies in a direction to frictionally engage the monobeam track side surfaces, air support spring means interposed between the respective bogie main frames and the overlying car body structure to yieldingly support said car bodies on said bogies, air supply and exhaust means individual to said respective air bearing rollers, said air traction springs and said air support spring means to control the entry and exit of pressurized air thereto, and control means responsive to the varying load of the respective car bodies for actuating said supply and exhaust means to vary the supply of pressurized air to effect level, friction free, air support of said car bodies and bogies in their travel along said monobeam track and varying traction pressure between the respective drive wheel assemblies and the monobeam track side surfaces in accord with load conditions.

9. A monobeam railway train truck assembly comprising a shallow main support frame made up of longitudinally extending angle bars fixedly connected to front and rear end transversely extending angle bars; air bearing rollers carried by said main support frame in subjacent transverse relation to said longitudinally extending angle bars for supporting said main frame on a monobeam track upper surface; motor mounting, drive wheel supporting, and wheel braking supporting subframes depending from each side of said main frame in laterally spaced relation; respective drive wheel assemblies, including a drive wheel, drive wheel stub axles, wheel brakes, and a lever arm support member pivotally connected to a respective subframe for swinging movement in a plane normal to said subframes to engage the oppositely facing side surfaces of a monobeam track; respective motive means mounted on said depending subframes; means drive connecting said drive wheel stub axles to said motive means; respective air traction springs acting on each of said lever arm support members to bias said pivotally connected drive wheel assemblies in a direction to frictionally engage said drive wheels with the monobeam track side surfaces; self levelling air support spring means mounted upon respective corners of said main frame to provide a yielding support for car bodies to be supported by said truck assemblies, said air traction springs and said air support spring means being interconnected whereby entry of and exit of pressurized air thereto to effect self levelling in response to varying load distribution will effect an increased and decreased traction pressure between the respective drive wheels and the monobeam track side faces in accord with the load conditions to assure a non-slipping drive relationship under all load conditions.

10. The truck assembly of claim 9 wherein each of the end transversely extending angle bars midway of its ends is provided with an upstanding pivot pin having a ball shaped connector head at its upper free end adapting said truck assembly for universal connection to the adjacently related ends of a pair of car bodies to serve as a common support truck assembly.

11. The truck assembly of claim 9 wherein a transverse support element is provided midway of the length of said longitudinally extending angle bars and an upstanding pivot pin having a ball shaped connector head at its upper free end is fixed midway of the length of said transverse support element adapting said truck assembly for universal connection to an end of a single car body to serve as a support for said car body end.

12. The truck assembly of claim 9 wherein the motive means includes a power shaft protruding from its opposite ends and mounted so the opposite shaft ends extending forwardly and rearwardly of said truck assembly and said means drive connecting said drive wheel stub axles to said motive means comprises a respective gear on the inner end of each said stub axle, a stub gear shaft fixedly journalled with relation to said axle and having a gear meshingly engaged with said axle shaft gear and a drive shaft having universal joints at its opposite ends drive connected respectively to a power shaft end and one of said stub gear shafts.

13. A monobeam truck assembly comprising a generally horizontally disposed main frame; a plurality of air bearing roller assemblies fixedly secured at opposite ends to said main frame in spaced relation longitudinally of said main frame and adapting said main frame for cushioned rolling movement along a monobeam trackway; a pair of respective subframes dependingly right angularly fixed in laterally spaced, longitudinal parallelism with respect to said main frame in position to be at opposite sides of the monobeam trackway during rolling movement of said main frame therealong; motive power means individual to each of said pair of subframes; a pair of drive wheel assemblies pivotally mounted on each of said subframes and including drive wheels swingable toward and away from the opposite sides of the monobeam trackway; air spring means individual to each drive wheel assembly for yieldingly biasing said drive wheels into tractive engagement with the monobeam trackway sides; and drive connections interconnecting the respective pairs of drive wheel assemblies to their related motive power means to drive said track assembly along said monobeam trackway.

14. The truck assembly of claim 13 together with air spring means supported by said main frame in position to yieldingly support a car body, said air spring means being self levelling in operation to assure proper level support of said car body irrespective of the payload and distribution of said payload and interconnected with said drive wheel biasing air spring means to vary the traction force in proportion as the payload increases and decreases.

15. The truck assembly of claim 13 together with a respective stabilizer wheel assembly pivotally mounted on each of said subframes below the level of said drive assemblies and including idler wheels swingable toward and away from the opposite sides of the monobeam trackway and air spring means individual to each stabilizer wheel assembly for yieldingly biasing said stabilizer wheels into engagement with the monobeam trackway to maintain said main frame against tilting.

16. A monorail railway comprising a monobeam trackway having top and side running surfaces and a load transportation vehicle comprising a car body having air cushioning means supporting said car body for relative friction free movement along the top running surface of said trackway and propulsion means including traction wheels drivingly cooperating with the side running surfaces of said trackway.

17. The monorail railway of claim 16 wherein said air cushion means comprises a compressed air chamber forming understructure carried by said car body in vertically opposed relation to said trackway top surface and having downwardly facing jet openings for directing jets of air against said trackway top surface to form a car body supporting high pressure layer of air between said compressed air chamber forming understructure and said trackway top surface.

18. The monorail railway of claim 17 wherein said air cushion means also comprises air bearing means disposed at each end of said car body and including rollers engaging said trackway top surface and isolated from said car body by a layer of high pressure air.

References Cited in the file of this patent

UNITED STATES PATENTS

| | | |
|---|---|---|
| 1,000,009 | Jenison | Aug. 8, 1911 |
| 1,152,451 | Theryc | Sept. 7, 1915 |
| 1,411,597 | Trask | Apr. 4, 1922 |
| 2,606,725 | Dreibelbis | Aug. 12, 1952 |
| 2,848,956 | Deist | Aug. 26, 1958 |
| 2,932,258 | Marquard | Apr. 12, 1960 |